United States Patent [19]

Mitsuoka et al.

[11] Patent Number: 5,895,634
[45] Date of Patent: Apr. 20, 1999

[54] DESULFURIZATION AND DECARBONATION PROCESS

[75] Inventors: Shigeaki Mitsuoka; Hiroshi Tanaka, both of Hiroshima-ken; Masaki Iijima, Tokyo, all of Japan

[73] Assignee: Mitsubishi Heavy Industries, Ltd., Tokyo, Japan

[21] Appl. No.: 08/859,113

[22] Filed: May 20, 1997

[30] Foreign Application Priority Data

May 28, 1996 [JP] Japan ................... 8-133365

[51] Int. Cl.$^6$ ................ B01D 53/50; B01D 53/62
[52] U.S. Cl. ............ 423/220; 423/228; 423/229; 423/243; 423/243.08; 423/555
[58] Field of Search ............ 423/555, 243.08, 423/243.01, 229, 228, 220

[56] References Cited

FOREIGN PATENT DOCUMENTS

| | | |
|---|---|---|
| 0671199 A2 | 9/1995 | European Pat. Off. . |
| 5-245338 | 9/1993 | Japan ................... 423/228 |
| 5-245339 | 9/1993 | Japan ................... 423/228 |
| 6-86911 | 3/1994 | Japan . |
| 6-99026 | 4/1994 | Japan ................... 423/228 |
| 94/12266 | 6/1994 | WIPO . |

OTHER PUBLICATIONS

English Abstract for Accession No. 93–049205 "Treat Combust Exhaust Gas Wet Desulphurise Remove Carbon Di Oxide Remove Poision Matter", corresponding to JP 05000231 A published on Jan. 1993.

*Primary Examiner*—Gary P. Straub
*Assistant Examiner*—Timothy C. Vanoy
*Attorney, Agent, or Firm*—Foley & Lardner

[57] ABSTRACT

This invention provides a process for effecting desulfurization and decarbonation in two stages. A gas containing sulfur oxides and carbon dioxide is first treated in a desulfurization step so as to cause sulfur oxides to be absorbed in the form of calcium-sulfur oxide compounds; the gas is then treated in a decarbonation step so as to cause carbon dioxide and any sulfur oxides escaping from the desulfurization step to be absorbed in the form of amine salts; the absorbing solution containing the amine salts is regenerated by liberating carbon dioxide therefrom; a part of the regenerated absorbing solution is recycled to the decarbonation step while the remainder of the absorbing solution is fed to a secondary regeneration step where it is treated with a basic calcium substance to regenerate basic amine compound for recycle and to form a solid containing calcium-sulfur oxide compounds and calcium carbonate.

12 Claims, 1 Drawing Sheet

DESULFURIZATION AND DECARBONATION PROCESS

BACKGROUND OF THE INVENTION

1. Field of the invention

This invention relates to a desulfurization and decarbonation process in which a gas containing sulfur oxides and carbon dioxide is treated with a basic calcium substance and a basic amine compound absorbent.

2. Description of the related art

In recent years, a variety of exhaust gas treating processes for use in facilities discharging large quantities of exhaust gas have been proposed from the viewpoint of air pollution prevention and global environment cleaning. For example, thermal electric power plants and boiler equipment use large quantities of coal, heavy oil and superheavy oil as fuels, and involve problems concerning volume and concentration control of the emission of sulfur oxides (typically sulfur dioxide), nitrogen oxides, carbon dioxide and the like.

In particular, sulfur oxides may produce sulfuric acid mist and acid rain in the presence of atmospheric moisture and thereby cause damage to human bodies, crops, forest and the like. Consequently, dry and wet treating processes have conventionally been proposed and practiced. For example, in such facilities, processes using lime as absorbent to form gypsum are being predominantly employed from an economic point of view.

Moreover, from the viewpoint of global warming, the control of the emission of carbon dioxide, together with Freon gases and methane gas, is recently examined. To this end, various methods such as PSA (pressure swing method), membrane separation/concentration, fixation by reaction with basic compounds, fixation by the anabolic action of plants, liquefaction or solidification of separated and purified carbon dioxide, and fuel regeneration by hydrogenation are investigated.

As an example of the prior art, a process for effecting desulfurization and decarbonation at the same time is proposed in Japanese Patent Provisional Publication No. 6-86911/'94. This process permits simplification of the equipment, but is not satisfactory in that a large amount of an amine absorbent is required for the purpose of absorbing carbon dioxide present in large quantities in addition to sulfur oxides, and the complete liberation of carbon dioxide alone is not necessarily advisable from the viewpoint of equipment and energy requirements. Moreover, in some cases, carbon dioxide may not be completely removed, thus affecting the quality of gypsum recovered.

Furthermore, in this process, the amine sulfate formed in the absorption tower is decomposed with the aid of sodium hydroxide or the like to regenerate the amine. However, since a considerable amount of sodium sulfate formed as a by-product is dissolved in the liquid phase, it is necessary to evaporate the amine and thereby separate it from sodium sulfate. This is disadvantageous in view of the amount of heating energy required and the possible deterioration of the amine.

SUMMARY OF THE INVENTION

The present invention has been made with a view to solving these problems, and an object thereof is to provide a process for effecting desulfurization and decarbonation in two stages wherein an amine-containing absorbing solution is regenerated in a thermally advantageous way and the salts (such as calcium carbonate and calcium sulfate) formed during regeneration are effectively utilized.

As a result of intensive investigations on the above-described object, the present inventors have discovered that the solid-liquid separation of the amine and by-products can be effected by decomposing the amine salts by use of a specific base, and the separated amine can be reused in the form of a liquid while the separated solid can be utilized as an absorbent for desulfurization. The present invention has been completed on the basis of this discovery.

Thus, the present invention relates to a desulfurization and decarbonation process for treating a gas containing sulfur oxides and carbon dioxide which comprises a desulfurization step for treating the gas with a basic calcium substance, a step for separating and discharging the resulting calcium salts, a decarbonation step subsequent to the desulfurization step for treating the gas with an absorbing solution containing a basic amine compound, a subsequent regeneration step for the absorbing solution, a subsequent secondary regeneration step for the absorbing solution, and a subsequent solid-liquid separation step, wherein the gas containing sulfur oxides and carbon dioxide is first treated in the desulfurization step so as to cause sulfur oxides to be absorbed in the form of calcium-sulfur oxide compounds; the gas is then treated in the decarbonation step so as to cause carbon dioxide and any sulfur oxides escaping from the desulfurization step to be absorbed in the form of amine salts; the absorbing solution containing the amine salts is treated in the regeneration step to liberate carbon dioxide therefrom; part of the absorbing solution having liberated carbon dioxide is recycled to the decarbonation step for use as the absorbing solution; the remainder of the absorbing solution having liberated carbon dioxide is fed to the secondary regeneration step where it is treated with a basic calcium substance to regenerate the absorbing solution containing the basic amine compound and to form a solid containing calcium-sulfur oxide compounds and calcium carbonate; the resulting liquid and solid are separated in the solid-liquid separation step, the separated liquid being recycled to the decarbonation step for use as the absorbing solution, and the separated solid being used as the basic calcium substance in the desulfurization step; and sulfur oxides are separated and discharged in the form of calcium salts.

In the above-described process of the present invention, if the regeneration of the absorbing solution in the secondary regeneration step is carried out by use of a basic calcium substance containing calcium hydroxide, calcium oxide or a mixture thereof, the absorbing solution containing the basic amine compound is efficiently regenerated and, at the same time, a solid containing calcium sulfate, calcium sulfite and calcium carbonate is produced. This product can be isolated by solid-liquid separation, and the separated amine can be reused in the form of a liquid.

On the other hand, it is preferable to use a calcium carbonate containing substance as the basic calcium substance in the desulfurization step, because limestone used as a raw material for the absorbent is abundantly yielded in many parts of the world and is inexpensive, and also because gypsum formed as a by-product can be utilized for the mass production of building boards and cement.

According to the present invention, in a process for effecting desulfurization and decarbonation in two stages, an amine-containing absorbing solution can be easily and completely recovered in liquid form and reused. Moreover, calcium carbonate produced in the amine regeneration step can be effectively utilized and highly pure gypsum alone is discharged from the system.

DETAILED DESCRIPTION OF PREFERRED EMBODIMENTS

Figure 1:
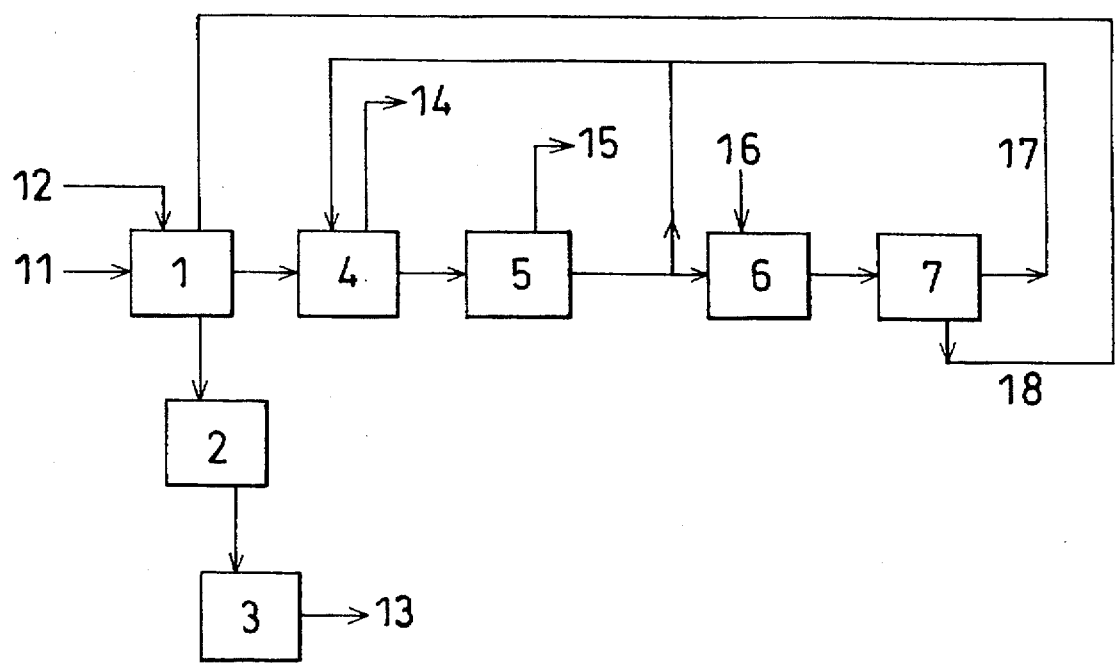
FIG. 1 is a flow diagram illustrating the process of the present invention.

The gas containing sulfur oxides and carbon dioxide, which is treated in the present invention, can be a gas for use as fuel or exhaust gas resulting from the combustion of fuel. Moreover, the present invention can also be applied to various other gases. The gas to be treated may further contain water, nitrogen oxides, oxygen and other acid gases. No particular limitation is placed on the pressure and temperature of the gas. That is, its pressure may be superatmospheric or subatmospheric, and its temperature may be high or low. Preferably, the gas is combustion exhaust gas and its pressure is substantially atmospheric. In particular, combustion exhaust gas containing 300 to 5,000 ppm of sulfur oxides and 3 to 15% by volume of carbon dioxide is preferably used.

The basic calcium substance used in the present invention is a substance containing calcium hydroxide, calcium oxide, calcium carbonate, calcium hydrogen carbonate or a mixture thereof, and it reacts with sulfur oxides to form calcium-sulfur oxide compounds such as calcium sulfate and calcium sulfite. The basic calcium substance may be used in the form of a solid, an aqueous solution or an aqueous suspension.

The basic amine compounds which can be used in the present invention include hydroxyamines such as monoethanolamine, diethanolamine and butylethanolamine; hindered amines such as dimethylaminoethanol and methylpyrrolidone; amino acids such as methylaminocarboxylic acids; and mixtures thereof. An absorbing solution can be prepared from such a basic amine compound and a suitable medium such as methanol, polyethylene glycol or water. Such a basic amine compound absorbs carbon dioxide to form a carbonate complex of the amine, but this complex decomposes on heating to release carbon dioxide and regenerate the amine. It is generally preferable that the heating temperature is in the range of 90 to 160° C.

For example, when monoethanolamine is used as the absorbent, the $CO_2$-absorbing reaction is represented by the following reaction formula.

Part of the absorbing solution having liberated carbon dioxide in the regeneration step is recycled to the decarbonation tower, where it is used as the absorbing solution.

The basic amine substance also reacts with a small amount of sulfur oxides escaping from the desulfurization step, and thereby forms amine sulfates and amine sulfites. The amine is not easily regenerated simply by heating these compounds. Accordingly, the remainder of the absorbing solution having liberated carbon dioxide is fed to the secondary regeneration step, where the amine is regenerated by decomposing the amine sulfates and the amine sulfites with the aid of a basic calcium substance at a temperature in the vicinity of the operating temperature of the regeneration step. Thus, the amine-containing absorbing solution is regenerated in liquid form. As the basic calcium substance, there may be used a substance containing calcium hydroxide, calcium oxide, calcium carbonate, calcium hydrogen carbonate or a mixture thereof as described above.

Since the amine-containing absorbing solution regenerated in the secondary regeneration step can be directly recycled to the decarbonation step and used therein, less energy is required and no substantial deterioration of the amine occurs, as contrasted with the process in which the amine is regenerated with the aid of sodium hydroxide and separated by evaporation under heated conditions.

When monoethanolamine is used as the absorbent, the $SO_2$-absorbing reaction is represented by the following reaction formula.

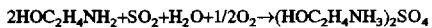

In the presence of a basic calcium substance (e.g., calcium hydroxide), the monoethanolamine having $SO_2$ absorbed therein forms gypsum according to the following reaction formula.

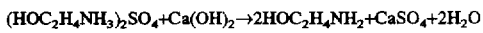

In this step, calcium sulfate and calcium sulfite are formed as by-product. Moreover, calcium carbonate is also present. These compounds have low solubility in the amine-containing absorbing solution and precipitate as a solid, so that they can be separated from the amine-containing absorbing solution by solid-liquid separation.

Since the solid contains calcium-sulfur oxide compounds and calcium carbonate, it can be utilized as the basic calcium substance in the desulfurization step. Alternatively, the solid can be utilized as the basic calcium substance in the desulfurization step after calcium sulfite is oxidized to calcium sulfate, if necessary.

The present invention is more specifically explained with reference to the flow diagram of FIG. 1.

A gas 11 containing sulfur oxides and carbon dioxide is introduced into a desulfurizer absorption tower 1, where 90 to 99% of the sulfur oxides are removed by contact with a suspension 12 of a basic calcium substance. In this step, the complete removal of sulfur oxides is not always efficient. Rather, it may be more efficient to remove residual sulfur oxides by absorption into an amine in the succeeding carbon dioxide absorption step. The present invention is particularly effective in such a case.

An absorption tower fluid tank 2 is installed at the bottom of desulfurizer absorption tower 1. After the absorption of sulfur oxides, the suspension of the basic calcium substance contains calcium sulfate and calcium sulfite. Accordingly, after the calcium sulfite is oxidized to calcium sulfate in absorption tower fluid tank 2, solid calcium sulfate 13 is separated by a centrifugal separator 3. For the purpose of solid-liquid separation, there may be used various devices such as a decanter and a dehydrator.

After most of the sulfur oxides have been removed in desulfurizer absorption tower 1, the resulting gas is introduced into a decarbonator absorption tower 4, where carbon dioxide and residual sulfur oxides are removed by contact with an absorbing solution containing a basic amine compound. The resulting gas is discharged as treated gas 14 or transferred to a subsequent necessary step.

After contact with the gas, the absorbing solution is fed to a regeneration tower 5 where most of the carbon dioxide 15 is liberated by heating or the like. In this step, the complete liberation of carbon dioxide is not always efficient. Rather, it may be more efficient to recover residual carbon dioxide as calcium carbonate in a secondary regenerator 6 installed downstream of regeneration tower 5. The present invention is particularly effective in such a case.

Part of the absorbing solution having liberated carbon dioxide is recycled to decarbonator absorption tower 4 for use as the absorbing solution. The remainder is fed to secondary regenerator 6 where the absorbing solution 17 containing the basic amine compound is regenerated by reaction with a basic calcium substance 16 such as calcium hydroxide. After a solid containing calcium sulfate, calcium sulfite and calcium carbonate is separated by a centrifugal separator 7, the regenerated absorbing solution 17 is recycled to decarbonator absorption tower 4. For the purpose of solid-liquid separation, there may be used various solid-liquid separators as described above, and such devices having a rinsing mechanism.

The ratio at which the absorbing solution having liberated carbon dioxide is fed to decarbonator absorption tower 4 and secondary regenerator 6 may be varied according to the state of desulfurization and decarbonation. The proportion of the absorbing solution fed to secondary regenerator 6 may be not less than 1% by volume, preferably not less than 50% by volume (and up 100% by volume), based on the total absorbing solution having liberated carbon dioxide. If it is less than 1% by volume, the degree of regeneration of the basic amine compound so low that the performance of the decarbonator may be reduced.

In secondary regenerator 6 for the absorbing solution, calcium sulfite may be oxidized to calcium sulfate by blowing air into the absorbing solution. Alternatively, this oxidation may be collectively performed in absorption tower fluid tank 2.

Since the solid 18 separated by centrifugal separator 7 contains calcium carbonate, it is fed to desulfurizer absorption tower 1 and utilized as part of the basic calcium substance. The calcium sulfate so formed is recovered as gypsum 13 and utilized for the manufacture of building materials and the like. Consequently, no by-product is discharged from the system in separation step 7, but all by-product is withdrawn from centrifugal separator 3. This by-product can be utilized as highly-pure gypsum.

The present invention is further illustrated by the following example. However, it is to be understood that the present invention is not limited thereto.

EXAMPLE 1

In a desulfurizer absorption tower, 500 Nm$^3$/hr of heavy oil combustion exhaust gas containing 1,200 ppm of sulfur oxides and 10.7% of carbon dioxide was brought into contact with 11 m$^3$/hr of a 15% slurry of calcium carbonate to remove 95% of the sulfur oxides by absorption into the slurry. Then, in a decarbonator absorption tower, the gas containing 60 ppm of residual sulfur oxides was brought into contact with a 30 wt.% aqueous solution of monoethanolamine at a gas/liquid ratio of 2.0 and at a temperature of 60° C. to remove carbon dioxide and sulfur oxides by absorption into the aqueous amine solution. The combustion exhaust gas freed of carbon dioxide and sulfur oxides was discharged into the atmosphere.

The absorbing solution having carbon dioxide and sulfur oxides absorbed therein was heated to 130° C. in a regeneration tower, thus liberating carbon dioxide. Part (90%) of the aqueous amine solution at the outlet of the regeneration tower was recycled to the decarbonator absorption tower for use as the absorbing solution. The remainder of the aqueous amine solution at the outlet of the regeneration tower was mixed with a slurry containing 7% of calcium hydroxide, oxidized with the aid of air, and then separated into an aqueous amine solution and a solid by the centrifugal separator 7. Similarly to the aforesaid part of the aqueous amine solution, the separated aqueous amine solution was recycled to the decarbonator absorption tower.

After 1,000 hours' operation, the proportion of the amine sulfates and the amine sulfites to the total amine present in the regenerated amine-containing absorbing solution remained constant at 0.9%, indicating stable and continuous removal by absorption of carbon dioxide and residual sulfur oxides. As a result, the degree of removal of sulfur oxides was 99.99% or greater and the degree of removal of carbon dioxide was 96%.

On the other hand, 2.9 kg/hr of a solid containing 90% (on a dry basis) of calcium carbonate together with calcium sulfate was separated and added to the calcium carbonate used in the desulfurizer for the purpose of forming gypsum. The resulting gypsum had a calcium carbonate concentration of as low as 3% and was suitable for use as a raw material for the manufacture of plaster boards for building use.

COMPARATIVE EXAMPLE 1

In Example 1, no calcium hydroxide suspension was added to the aqueous amine solution at the outlet of the decarbonator. That is, the aqueous amine solution was recycled without being regenerated. After 1,000 hours' operation, the proportion of the amine sulfates and the amine sulfites to the total amine present in the regenerated amine-containing absorbing solution increased to 33%. Then, the degree of removal by absorption of carbon dioxide and residual sulfur oxides was reduced to 86% of the value immediately after the start of operation.

The present invention has been described above in connection with specific embodiments. It is to be understood that the process of the present invention can be carried out in continuous, batch or semibatch operation.

We claim:

1. A desulfurization and decarbonation process for treating a gas containing sulfur oxides and carbon dioxide which comprises:

a desulfurization step comprising treating the gas with a basic calcium substance, wherein the gas containing sulfur oxides and carbon dioxide is treated so as to cause sulfur oxides to be absorbed to result in the formation of calcium-sulfur oxide compounds;

a step for separating and discharging the resulting calcium salts;

a decarbonation step subsequent to the desulfurization step comprising further treating the gas with an absorbing solution containing a basic amine compound, that causes carbon dioxide and sulfur oxides escaping from the desulfurization step to be absorbed in the form of amine salts;

a first regeneration step for the absorbing solution, wherein the absorbing solution containing the amine salts is treated to liberate carbon dioxide therefrom;

recycling step, wherein a portion of the regenerated amine absorbing solution is recycled back to the decarbonation step, a subsequent secondary regeneration step, wherein the remainder of the regenerated amine absorbing solution is treated with a basic calcium substance to result in the formation of calcium-sulfur oxide compounds, and a subsequent solid-liquid separation step, wherein the calcium-sulfur compounds formed in the secondary regeneration step are separated from the absorbing solution, the separated solids are recycled to the desulfurization step for use as the basic calcium substance and the separated absorbing solution is recycled to the decarbonation step for use as the absorbing solution.

2. A desulfurization and decarbonation process as claimed in claim 1, wherein the regeneration of the absorbing solution in the secondary regeneration step is carried out using a basic calcium substance including at least one selected from the group consisting of calcium hydroxide, calcium oxide, calcium carbonate and calcium hydrogen carbonate.

3. A desulfurization and decarbonation process as claimed in claim 1, wherein the basic calcium substance used in the desulfurization step is a substance including at least one selected from the group consisting of calcium hydroxide, calcium oxide, calcium carbonate and calcium hydrogen carbonate.

4. A desulfurization and decarbonation process as claimed in claim 1, wherein the portion of the absorbing solution fed to the secondary regeneration step is in the range of 50 to 100% by volume based on the total of the absorbing solution.

5. A desulfurization and decarbonation process as claimed in claim 1, wherein said gas is a fuel or an exhaust gas resulting from the combustion of fuel.

6. A desulfurization and decarbonation process as claimed in claim 1, wherein said gas includes water, nitrogen oxides, oxygen and/or other acid gases.

7. A desulfurization and decarbonation process as claimed in claim 1, wherein said gas is a combustion exhaust gas comprising 300 to 5,000 ppm of sulfur oxides and 3 to 15% by volume of carbon dioxide.

8. A desulfurization and decarbonation process as claimed in claim 1, wherein the basic calcium substance is in the form of a solid, an aqueous solution or an aqueous suspension.

9. A desulfurization and decarbonation process as claimed in claim 1, wherein said basic amine compound is selected from the group consisting of monoethanolamine, diethanolamine, butylethanolamine, dimethylaminoethanol, methylpyrrolidone, methylaminocarboxylic acids, and mixtures thereof.

10. A desulfurization and decarbonation process as claimed in claim 1, wherein 90 to 99% of sulfur oxides present in said gas are removed in said desulfurization step by treating the gas with said basic calcium substance.

11. A desulfurization and decarbonation process as claimed in claim 1, wherein said solid-liquid separation is accomplished using a decanter or a dehydrator which optionally includes a rinsing mechanism.

12. A desulfurization and decarbonation process as claimed in claim 1, wherein the proportion of absorbing solution having liberated carbon dioxide fed to said secondary regeneration step is not less than 1% by volume based on the total volume of the absorbing solution.

* * * * *